(12) United States Patent
Gouda et al.

(10) Patent No.: US 8,491,715 B2
(45) Date of Patent: Jul. 23, 2013

(54) INK, INK CARTRIDGE AND INK JET RECORDING METHOD

(75) Inventors: Keigo Gouda, Kawasaki (JP); Masashi Ogasawara, Machida (JP); Tomonari Watanabe, Kawasaki (JP); Fumiaki Fujioka, Kawasaki (JP); Souichi Nagai, Kawasaki (JP); Akiko Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/176,147

(22) Filed: Jul. 5, 2011

(65) Prior Publication Data

US 2012/0033009 A1 Feb. 9, 2012

(30) Foreign Application Priority Data

Aug. 3, 2010 (JP) ................. 2010-174065

(51) Int. Cl.
*C09D 11/02* (2006.01)
(52) U.S. Cl.
USPC ............. 106/31.86; 106/31.89; 106/31.6
(58) Field of Classification Search
USPC .................................. 106/31.86
See application file for complete search history.

(56) References Cited

U.S. PATENT DOCUMENTS

| | | | |
|---|---|---|---|
| 5,835,116 A | 11/1998 | Sato et al. | |
| 6,027,210 A | 2/2000 | Kurabayashi et al. | |
| 6,210,473 B1 * | 4/2001 | Boils et al. | 106/31.43 |
| 6,238,045 B1 | 5/2001 | Ono et al. | |
| 6,398,355 B1 | 6/2002 | Shirota et al. | |
| 6,412,936 B1 | 7/2002 | Mafune et al. | |
| 6,521,034 B1 | 2/2003 | Osumi et al. | |
| 6,547,381 B2 | 4/2003 | Watanabe et al. | |
| 6,706,105 B2 | 3/2004 | Takada et al. | |
| 6,733,120 B2 | 5/2004 | Ogasawara et al. | |
| 7,005,461 B2 | 2/2006 | Sanada et al. | |
| 7,160,376 B2 | 1/2007 | Watanabe et al. | |
| 7,267,717 B2 | 9/2007 | Watanabe et al. | |
| 7,276,112 B2 | 10/2007 | Tokuda et al. | |
| 7,297,203 B2 | 11/2007 | Takada et al. | |
| 7,371,274 B2 | 5/2008 | Sanada et al. | |
| 7,377,631 B2 | 5/2008 | Takada et al. | |
| 7,601,210 B2 | 10/2009 | Fujioka et al. | |
| 7,605,192 B2 | 10/2009 | Sanada et al. | |
| 7,682,433 B2 | 3/2010 | Yanagimachi et al. | |
| 7,699,924 B2 | 4/2010 | Mafune et al. | |
| 7,705,071 B2 | 4/2010 | Nakagawa et al. | |
| 7,753,515 B2 | 7/2010 | Tokuda et al. | |
| 7,806,970 B2 | 10/2010 | Fujioka et al. | |
| 7,883,199 B2 | 2/2011 | Hakamada et al. | |
| 7,909,448 B2 | 3/2011 | Iwata et al. | |
| 8,007,097 B2 | 8/2011 | Sanada et al. | |
| 2001/0008908 A1 | 7/2001 | Parazak | |
| 2001/0018472 A1 | 8/2001 | Parazak et al. | |
| 2001/0020431 A1 | 9/2001 | Osumi et al. | |
| 2002/0036677 A1 | 3/2002 | Watanabe et al. | |
| 2002/0077384 A1 | 6/2002 | Sano et al. | |
| 2007/0100024 A1 * | 5/2007 | Gu et al. | 523/160 |
| 2008/0018722 A1 * | 1/2008 | Mafune et al. | 347/100 |
| 2009/0229489 A1 * | 9/2009 | Gu | 106/31.75 |
| 2009/0258145 A1 | 10/2009 | Mukae et al. | |
| 2010/0033522 A1 | 2/2010 | Saito et al. | |

FOREIGN PATENT DOCUMENTS

| | | | |
|---|---|---|---|
| CN | 1232846 A | | 10/1999 |
| CN | 1332209 A | | 1/2002 |
| EP | 0943666 A2 | | 9/1999 |
| EP | 0 997 506 A1 | | 5/2000 |
| EP | 1 153 992 A1 | | 11/2001 |
| EP | 1167471 A2 | | 1/2002 |
| JP | 2000-198955 A | | 7/2000 |
| JP | 2002-080763 A | | 3/2002 |
| JP | 2008-001891 A | | 1/2008 |
| JP | 2009-515007 A | | 4/2009 |
| WO | 2007/053563 A2 | | 5/2007 |
| WO | 2007/053564 A2 | | 5/2007 |

OTHER PUBLICATIONS

Nov. 18, 2011 European Search Report in European Patent Appln. No. 11005735.3.

* cited by examiner

*Primary Examiner* — Kaj K Olsen
*Assistant Examiner* — Veronica F Faison
(74) *Attorney, Agent, or Firm* — Fitzpatrick, Cella, Harper & Scinto

(57) ABSTRACT

Disclosed herein are an ink containing a self-dispersible pigment and a salt, wherein the self-dispersible pigment is a pigment to the surface of a particle of which a functional group containing at least a group having a hydrogen bonding property and two phosphonic acid groups is bonded, counter ions of the two phosphonic acid groups containing one of $K^+$ and $NH_4^+$; the salt is constituted by combining at least one cation of $K^+$ and $NH_4^+$ with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$; a cation concentration in the ink is 0.04 mol/L or more; and the viscosity of a liquid obtained by evaporating 15% by mass of the ink is less than 3.5 mPa·s at 25° C.

20 Claims, No Drawings

INK, INK CARTRIDGE AND INK JET RECORDING METHOD

BACKGROUND OF THE INVENTION

1. Field of the Invention

The present invention relates to an ink, an ink cartridge and an ink jet recording method.

2. Description of the Related Art

In recent years, an ink used for an ink jet recording method has been required to still more improve the image density of a recorded image. Among recording media on which an image is recorded, various kinds of plain paper, which are different in ink permeability, are available, and the difference in ink permeability affects image characteristics. In particular, a recording medium high in ink permeability tends to lower the image density of an image formed. In recent years, the ink jet recording method has been widely used; accordingly, an image formed thereby has been required to achieve a high image density irrespective of the kind of the recording medium including such a recording medium high in permeability.

In order to meet the above requirement, there are proposals for improving printed letter quality and image density by an ink containing a self-dispersible pigment to the surfaces of particles of which a functional group such as a carboxylic acid group is bonded and a salt (see Japanese Patent Application Laid-Open No. 2000-198955, Japanese Patent Application Laid-Open No. 2008-001891 and Japanese Patent Application Laid-Open No. 2002-080763). Japanese Patent Application Laid-Open No. 2008-001891 and Japanese Patent Application Laid-Open No. 2002-080763 describe that the image density of a recorded image can be improved by more increasing the density of the functional group on the surfaces of the pigment particles. There is also a proposal for improving the image density by an ink containing a self-dispersible pigment to which a functional group high in reactivity to calcium is bonded on the basis of a calcium index that is an index of reactivity to calcium (see Japanese Patent Application Laid-Open No. 2009-515007). Japanese Patent Application Laid-Open No. 2009-515007 discloses a self-dispersible pigment to the surfaces of particles of which a phosphonic acid group is bonded.

SUMMARY OF THE INVENTION

As described above, it has heretofore been said that the image density can be increased by the ink containing the self-dispersible pigment and the salt. However, according to an investigation by the present inventors, the image density in the recording medium high in permeability of ink is not yet sufficient. In addition, the image density can be more increased by containing a greater amount of the salt in the ink. However, when evaporation of the ink occurs upon physical distribution and use of the ink, the dispersed state of the pigment in the ink becomes unstable, causing such another problem that good evaporation stability is not achieved.

Accordingly, it is an object of the present invention to provide an ink that is excellent in evaporation stability and capable of providing an excellent image high in image density irrespective of the kind of a recording medium used, and an ink cartridge and an ink jet recording method using this ink.

The above object can be achieved by the present invention described below. More specifically, an ink according to the present invention is an ink jet ink comprising a self-dispersible pigment and a salt, wherein the self-dispersible pigment is a pigment to a surface of a particle of which a functional group containing at least a group having a hydrogen bonding property and two phosphonic acid groups is bonded, counter ions of the two phosphonic acid groups containing at least one of $K^+$ and $NH_4^+$, wherein the salt is constituted by combining at least one cation of $K^+$ and $NH_4^+$ with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$, wherein a cation concentration in the ink is 0.04 mol/L or more, and wherein a viscosity of a liquid obtained by evaporating 15% by mass of the ink is less than 3.5 mPa·s at 25° C.

The present invention also provides an ink cartridge comprising an ink storage portion storing an ink, wherein the ink stored in the ink storage portion is the ink described above.

The present invention further provides an ink jet recording method comprising ejecting an ink from a recording head of an ink jet system to record an image on a recording medium, wherein the ink is the ink described above.

According to the present invention, there can be provided an ink that is excellent in evaporation stability and capable of providing an excellent image high in image density irrespective of the kind of a recording medium used, and an ink cartridge and an ink jet recording method using this ink.

Further features of the present invention will become apparent from the following description of exemplary embodiments.

DESCRIPTION OF THE EMBODIMENTS

Preferred embodiments of the present invention will now be described in detail. Incidentally, in the following description, an ink jet ink may be abbreviated as "ink" merely. The two phosphonic acid groups and the pigment having the two phosphonic acid groups may be described as "bisphosphonic acid group" and "bisphosphonic acid type self-dispersible pigment", respectively. In the present invention, various physical property values are values at 25° C. unless expressly noted.

The dispersed state of a self-dispersible pigment in an ink applied to a recording medium becomes unstable attending on occurrence of change of the component ratio of the ink due to evaporation of water in the ink and permeation of the ink, thereby causing aggregation. In this case, it has been found that if the structure of a functional group bonded to the surfaces of the pigment particle and a salt are combined according to the present invention, which will be described subsequently, whereby the image density of an image formed is greatly improved compared with an image obtained by using a conventional ink containing a carboxylic acid type self-dispersible pigment and the salt. Specifically, such a self-dispersible pigment that a functional group containing at least a group having a hydrogen bonding property and two phosphonic acid groups is bonded to the particle surface and the counter ions are $K^+$ or $NH_4^+$ is used. On the other hand, as the salt used in combination with the pigment, a salt formed by at least one cation of $K^+$ or $NH_4^+$ and an anion selected from the specific groups is used in combination. The present inventors have found that the image density of an image to be recorded is markedly improved by such constitution according to the present invention compared with the conventional ink containing a self-dispersible pigment and a salt.

The present inventors presume the mechanism achieves such an effect as follows. First, regarding the combination of the pigment containing the bisphosphonic acid group as a functional group with the specific salt, such a pigment strongly reacts with calcium contained in a recording medium, thereby achieving the above-described effect to improve the image density. This is supported even by the fact that the bisphosphonic acid has strong reactivity to calcium compared with a monophosphonic acid. For example, when attention is paid to a solubility of a calcium salt at 20° C., which is a parameter useful in determining the reactivity to calcium, there is the following difference between a monocarboxylic acid and a biscarboxylic acid. The solubility of calcium acetate, which is the monocarboxylic acid, is 40 g/100 mL of water, while the solubility of calcium oxalate, which is the biscarboxylic acid, is $6.7\times10^{-4}$ g/100 mL of water. Even when comparison is made on solubility per 1 mol of a carboxylic acid, the solubility of a divalent carboxylic acid is lower. From the fact regarding these carboxylic acids, it is expected that regarding phosphonic acids, the bisphosphonic acid is lower in solubility of the calcium salt than the monophosphonic acid. In short, it is inferred that the bisphosphonic acid is higher in the reactivity to calcium than the monophosphonic acid. This can be confirmed even by comparing the calcium indexes described in Japanese Patent Application Laid-Open No. 2009-515007.

According to an investigation by the present inventors, however, even an ink containing the pigment containing the bisphosphonic acid as the functional group is more greatly affected by the permeation of the ink than the aggregation of the pigment by the reaction with calcium in a recording medium with high permeability, unless the specific salt is added to the ink. In this case, the pigment does not remain in the vicinity of the surface of the recording medium, and the degree of improvement in the image density is limited, so that a great effect to improve the image density cannot be expected. On the other hand, it has been found that when the dispersed state of the pigment in the ink is somewhat destabilized by adding the specific salt to the ink when evaporation of water in the ink or permeation of the ink occurs, the improvement in the image density is efficiently achieved. In other words, it is important that the ink is prepared according to the constitution of the present invention, thereby causing the pigment to quickly react with calcium after the ink is applied to the recording medium, such that a great amount of the pigment remains in the vicinity of the surface of the recording medium even when the recording medium is high in permeability.

The combination of the counter ions of the bisphosphonic acid contained in the functional group of the pigment with the salt added into the ink will now be described. When the phosphonic acid contained in the functional group of the pigment used in the present invention is regarded as a salt, i.e., a phosphoric acid salt (lithium phosphate, sodium phosphate, potassium phosphate, ammonium phosphate or calcium phosphate), the solubility thereof is as shown in Table 1. As apparent from Table 1, potassium phosphate and ammonium phosphate are high in solubility compared with calcium phosphate. Incidentally, the counter ions (M) of the two phosphonic acid groups constituting the pigment used in the present invention may include even a hydrogen atom in some cases from the relation with the dissociation constant. However, the salt is regarded as a salt equivalently neutralized for the sake of convenience.

TABLE 1

| | Solubility of salt | | | |
|---|---|---|---|---|
| | Kind in case where carboxylic acid group of carboxylic acid type self-dispersible pigment is regarded as salt (acetate) | | Kind in case where phosphoric acid group of phosphoric acid type self-dispersible pigment is regarded as salt (phosphate) | |
| Kind of cation | Solubility [mol/100 mL of water] | Ratio when calcium acetate is regarded as 1 | Solubility [mol/100 mL of water] | Ratio when calcium phosphate is regarded as 1 |
| Li$^+$ | 0.62 | 1.2 | $2.59 \times 10^{-4}$ | 16 |
| Na$^+$ | 0.57 | 1.1 | $9.15 \times 10^{-3}$ | 568 |
| K$^+$ | 2.61 | 5.1 | $2.42 \times 10^{-1}$ | 15,031 |
| NH$_4^+$ | 1.92 | 3.8 | $1.04 \times 10^{-1}$ | 6,460 |
| Ca$^{2+}$ (converted to monovalent) | 0.51 | — | $1.61 \times 10^{-5}$ | — |

From this result, it is inferred that a salt of at least one of potassium and ammonium, which is high in the solubility of the phosphoric acid salt, is added into the ink, whereby a reaction with calcium is selectively caused to accelerate aggregation of the pigment by deposition of calcium phosphate and so on. It is also considered that in the reaction with a polyvalent metal such as calcium, the phosphonic acid contained in the functional group of the pigment forms a complex with calcium, and consequently larger aggregates of the pigment are formed to increase the image density.

On the other hand, when the phosphonic acid contained in the functional group is regarded as a salt, i.e., a phosphoric acid salt, it is disadvantageous from the viewpoint of improvement in image density, as described below, for the case where a salt of lithium or sodium is contained in the ink. First, lithium and sodium are low in the solubility of the phosphoric acid salt compared with potassium and ammonium, so that the pigment is liable to aggregate as an alkali metal salt (lithium phosphate or sodium phosphate). Thus, the reaction with calcium that is desired to quickly react when the ink is applied to a recording medium is inhibited, and so an aggregate is not so greatly grown. As a result, the improvement in image density cannot be expected compared with the case where the potassium and ammonium salts are used.

It is also considered for the following reason that another self-dispersible pigment having a functional group containing a carboxylic acid group than the bisphosphonic acid type, which is widely used in the conventional inks, does not have the marked effect exhibited by the combination of the bisphosphonic acid type self-dispersible pigment according to the present invention with K$^+$ and/or NH$_4^+$. In short, in the self-dispersible pigment having the functional group containing the carboxylic acid group, a difference in solubility between the calcium salt of the carboxylic acid group contained in the functional group and the alkali metal salt thereof is small as shown in Table 1, and a difference in solubility among the alkali metal salts thereof is also small. From these facts, the carboxylic acid type self-dispersible pigment cannot achieve the effect of the present invention.

In other words, in the ink according to the present invention, attention is paid to the difference in solubility among the salts (calcium salt and alkali metal salts) of the phosphonic acid group contained in the functional group, and improvements in both evaporation stability of the ink and image density are realized from this. In the present invention, it is important to combine the kinds of the counter ions and the cation of the salt in such a manner that a difference in solubility between a salt of a cation derived from the salt added into the ink as a salt of the phosphonic acid group contained in the functional group and the calcium salt of the phosphonic acid group contained in the functional group is large. In the present invention, such a combination that the difference between the solubility ratios is 5,000 or more is favorable.

The present inventors have investigated the relation between the introduced amount of the functional group and the amount of the salt added into the ink in relation to the evaporation stability of the ink containing the bisphosphonic acid type self-dispersible pigment. As a result, it has been found that the evaporation stability of the ink depends on the cation concentration in the ink, not on the amount of the salt. Here, the amount of the cation derived from the functional group in the ink varies according to the introduced amount of the functional group. In addition, it has been found that the influence of the introduced amount of the functional group on the improvement in image density is relatively small, and rather the improvement greatly depends on the amount of the salt added into the ink. However, it has been found that the amount of the salt to retain the evaporation stability of the ink depends on the introduced amount of the functional group. The present inventors presume the reason for this as follows.

In the self-dispersible pigment used in the present invention, a bulky hydrophilic group called a bisphosphonic acid group is present in a terminal portion of the functional group, and a group having a hydrogen bonding property is present between the surface of the pigment particle and the bisphosphonic acid group in the functional group, so that the dispersed state of the pigment becomes more stable. In detail, it is considered that the self-dispersible pigment having such a structure is in such a state that water molecules have been captured between the terminal portion of the functional group and the surface of the pigment particle, and so the dispersed state of the pigment becomes more stable owing to hydration. In this case, the numbers of hydrophilic groups in the terminal portion of the functional group and water molecules capable of being present on the surface of the pigment particle become greater as the introduced amount of the functional group is smaller, and the dispersed state of the pigment is more stabilized by increase in hydration repulsion attending on it. Therefore, the concentration of a co-existable electrolyte, i.e., the amount of the salt, comes to be increased. The above-described condition means that the amount of the salt to retain the evaporation stability of the ink depends on the introduced amount of the functional group in the self-dispersible pigment.

Accordingly, in the case of the bisphosphonic acid type self-dispersible pigment, the electrolyte concentration in the ink to retain the evaporation stability of the ink can be increased when the introduced amount of the functional group is small. As a result, an ink using this pigment can achieve a high image density by more accelerating the aggregation of the pigment attending on evaporation of water and permeation of the ink after the ink is applied to a recording medium while retaining the evaporation stability of the ink compared with a pigment great in the introduced amount of the functional group. However, the cation concentration in the ink to retain the evaporation stability of the ink may vary according to the composition of the ink. For example, when the dielectric constant of a water-soluble organic solvent in the ink is high, the amount of the salt to retain the evaporation stability increases.

From these results, in the present invention, from the viewpoints of improving both image density and evaporation stability, the cation concentration in the ink in relation to the image density has been controlled to 0.04 mol/L or more to define the concentration range achieving this effect. In addition, regarding the evaporation stability of the ink, the viscosity of a liquid obtained by evaporating 15% by mass of the ink (liquid, the evaporation rate of which is 15%) has been set to be less than 3.5 mPa·s at 25° C. because the upper limit of the cation concentration capable of surely retaining the performance thereof may vary according to the composition of the ink. Defining these features led to such an idea that both image density and evaporation stability can be improved to complete the present invention.

Incidentally, the value of 15% as to the evaporation rate is a sufficiently higher value with respect to the amount of evaporation of ink which may occur when conditions upon physical distribution and use of the ink are taken into consideration. It is supposed that the ink according to the present invention has sufficient evaporation stability so far as the evaporation stability evaluated under severer conditions than actually assumed conditions is sufficient.

Ink:

Respective components constituting the ink according to the present invention and physical properties of the ink will hereinafter be described in detail.

Pigment:

Examples of the pigment include organic pigments and inorganic pigment such as carbon black, and any pigment may be used so far as it is usable for ink jet inks. A dye may also be used in combination with the pigment for purposes of color adjustment. In the present invention, it is particularly favorable to prepare a black ink using carbon black as the pigment. The content (% by mass) of the pigment in the ink is favorably 0.1% by mass or more and 15.0% by mass or less, more favorably 1.0% by mass or more and 10.0% by mass or less, based on the total mass of the ink.

The pigment used in the ink according to the present invention is a self-dispersible pigment to the surface of a particle of which a functional group containing at least a group having a hydrogen bonding property and two phosphonic acid groups is bonded, wherein counter ions of the two phosphonic acid groups contain one of $K^+$ and $NH_4^+$. Such a self-dispersible pigment is used, whereby the addition of a dispersant for dispersing the pigment in the ink can be rendered unnecessary, or the amount of the dispersant added can be lessened.

The phosphonic acid group —$PO(O[M_1])_2$ may be in any state of a partially dissociated state and a wholly dissociated state. In short, this group may take any form of —$PO_3H^-M_1^+$ (monobasic salt) and —$PO_3^{2-}(M_1^+)_2$ (dibasic salt). Accordingly, the counter ion represented by $M_1^+$ contains at least one of $K^+$ and $NH_4$, and the other one may be $H^+$. In the present invention, it is favorable that the two phosphonic acid groups are located at the terminal of the functional group, namely, an atomic group containing a group having a hydrogen bonding property is present between the surface of the pigment particle and the two phosphonic acid groups.

The functional group bonded to the surface of the particle of the self-dispersible pigment used in the ink according to the present invention is required to contain a group having a hydrogen bonding property. Specific examples of the group having a hydrogen bonding property include amide group, amino group, ketone group, ester group and hydroxyl group. In addition, the functional group favorably contains a linear or branched alkylene group having 1 to 12 carbon atoms or an arylene group such as a phenylene or naphthylene group. In the present invention, the functional group particularly favorably contains —$C_6H_4$—CONH— (benzamide structure).

In the present invention, the functional group bonded to the surface of the pigment particle more favorably contains a structure of —CQ(PO$_3$[M$_1$]$_2$)$_2$. Here, Q in the formula is any one of a hydrogen atom, R, OR, SR and N(R)$_2$, and R is any one of a hydrogen atom, and alkyl, acyl, aralkyl and aryl groups. When R is a group containing a carbon atom, the number of carbon atoms contained in that group is favorably 1 to 18. Specific examples of such a group include alkyl groups such as methyl and ethyl groups, acyl groups such as acetyl and benzoyl groups, aralkyl groups such as a benzyl group, and aryl groups such as phenyl and naphthyl groups. M$_1$ is any one of H, K and NH$_4$ and contains at least one of K and NH$_4$. In the present invention, a functional group containing a structure of —CH(PO$_3$[M$_1$]$_2$)$_2$, which is the case where Q is a hydrogen atom, is particularly favorably bonded to the surfaces of the pigment particles.

Introduced Amount of Functional Group:

In the case of such a conventional self-dispersible pigment to which an ionic group such as a carboxylic acid group is bonded, as investigated in Japanese Patent Application Laid-Open No. 2008-001891 and Japanese Patent Application Laid-Open No. 2002-080763, not the bisphosphonic acid type self-dispersible pigment, the improvement in image density has been made by increasing the introduced amount of the functional group. This is because a water-soluble organic solvent in an ink can be made hard to solvate the pigment by the influence of steric hindrance by the functional group and by lessening the area of a portion where no functional group is bonded on the surface of the pigment particle, which portion has affinity for the water-soluble organic solvent.

However, the bisphosphonic acid type self-dispersible pigment is high in aggregating ability compared with the carboxylic acid type (see the solubilities of alkali metal salts in Table 1) and sensitive to the cation concentration in the ink. Therefore, the introduced amount of the functional group is favorably smaller for achieving the evaporation stability of the ink at a higher level because the amount of the cation derived from the functional group can be lessened. On the other hand, regarding the image density, the bisphosphonic acid type self-dispersible pigment is scarcely affected by the introduced amount of the functional group because such a pigment very strongly reacts with calcium, but depends on the amount of the salt added into the ink. From this, the introduced amount of the functional group is favorably made smaller like the above even for achieving a higher image density and for enhancing tolerance for the cation concentration.

In order to improve both image density and evaporation stability at a high level, the introduced amount of the functional group in the bisphosphonic acid type self-dispersible pigment is favorably smaller from the reasons described above unlike the conventional carboxylic acid type self-dispersible pigment. Specifically, the introduced amount is favorably 0.38 mmol/g or less. However, if the introduced amount of the functional group is too small, the dispersed state of the pigment becomes unstable, so that the storage stability of the ink may not be sufficiently achieved in some cases. Thus, the introduced amount of the functional group in the bisphosphonic acid type self-dispersible pigment is favorably 0.10 mmol/g or more. Incidentally, the unit of the introduced amount of the functional group is the number of millimoles of the functional group per 1 g of pigment solid content.

The introduced amount of the functional group into the surface of the self-dispersible pigment particle in the present invention can be measured by conducting quantitative analysis of phosphorus in the following manner. Specifically, a pigment dispersion liquid is first diluted with pure water in such a manner that the content (solid content) of the pigment is about 0.03% by mass to prepare a liquid A. The pigment dispersion liquid is ultra-centrifuged under conditions of 25° C., 80,000 rpm and 15 hours to collect a supernatant liquid from which the pigment has been removed, and this liquid is diluted about 80 times with pure water to prepare a liquid B. With respect to the thus obtained liquids A and B, quantitative analysis of phosphorus was performed by an ICP emission spectral analyzer, and the amount of the phosphonic acid group can be calculated out from a difference in the amount of phosphorus determined from the measured values of the liquids A and B. The introduced amount of the functional group in the pigment can be calculated out according to (amount of phosphonic acid group)/n (n denotes the number of phosphonic acid groups contained in one functional group, and is 1 for mono, 2 for bis and 3 for tris). When the number of phosphonic acid groups contained in the functional group is not known, the number can be known by analyzing the structure thereof by NMR. Incidentally, the measuring method using the pigment dispersion liquid has been described above. However, the measurement can be made by using an ink. Needless to say, the measuring method of the introduced amount of the functional group is not limited to the method described above.

Salt Constituted by Combining Cation with Anion:

The ink according to the present invention contains a salt constituted by combining a cation with an anion, which is a characteristic feature. The cation is at least one of K$^+$ and NH$_4^+$. The anion is at least one selected from the group consisting of Cl$^-$, Br$^-$, I$^-$, ClO$^-$, ClO$_2^-$, ClO$_3^-$, ClO$_4^-$, NO$_2^-$, NO$_3^-$, SO$_4^{2-}$, CO$_3^{2-}$, HCO$_3^-$, HCOO$^-$, (COO$^-$)$_2$, COOH (COO$^-$), CH$_3$COO$^-$, C$_2$H$_4$ (COO$^-$)$_2$, C$_6$H$_5$COO$^-$, C$_6$H$_4$ (COO$^-$)$_2$, PO$_4^{3-}$, HPO$_4^{2-}$ and H$_2$PO$_4^-$. In short, the salt added into the ink is required to be a salt of potassium or ammonium. The form of the salt in the ink may be in any state of a partially dissociated state and a wholly dissociated state. Such a salt is used, whereby both evaporation stability of the ink and image density of a recorded image can be improved at a high level.

Examples of the salt usable in the ink according to the present invention constituted by combining the cation with anion include the following salts: (M$_2$)Cl, (M$_2$)Br, (M$_2$)I, (M$_2$)ClO, (M$_2$)ClO$_2$, (M$_2$)ClO$_3$, (M$_2$)ClO$_4$, (M$_2$)NO$_2$, (M$_2$)NO$_3$, (M$_2$)$_2$SO$_4$, (M$_2$)$_2$CO$_3$, (M$_2$)HCO$_3$, HCOO(M$_2$), (COOM$_2$)$_2$, COOH(COOM$_2$), CH$_3$COOM$_2$, C$_2$H$_4$ (COOM$_2$)$_2$, C$_6$H$_5$COOM$_2$, C$_6$H$_4$ (COOM$_2$)$_2$, (M$_2$)$_3$PO$_4$, (M$_2$)$_2$HPO$_4$ and (M$_2$)H$_2$PO$_4$. Incidentally, M$_2$ is at least one of potassium and ammonium. In the present invention, the anion constituting the salt is particularly favorably at least one selected from the group consisting of C$_2$H$_4$ (COO$^-$)$_2$, C$_6$H$_4$ (COO$^-$)$_2$ and SO$_4^{2-}$. A salt constituted by containing such an anion is particularly favorable because the resulting ink is particularly excellent in storage stability even when the ink evaporates and can improve the image density at a high level.

It is only necessary for the ink to contain the salt within a range sufficiently achieving the effect of the present invention. Specifically, the content (% by mass) of the salt in the ink is favorably 0.05% by mass or more and 10.0% by mass or less based on the total mass of the ink. If the content is more than 10.0% by mass, the storage stability may not be sufficiently achieved in some cases. If the content is less than 0.05% by mass, the effect of the present invention may not be sufficiently achieved in some cases.

The present inventors have carried out a detailed investigation as to the content of the salt. As a result, it has been found that the ink is particularly favorably designed by determining the content of the salt so as to satisfy the following 2 requirements. First, the particle size of the pigment in a liquid obtained by evaporating 40% by mass of the ink is favorably 1.2 times or more as much as the particle size of the pigment in the initial ink before the evaporation. Incidentally, the particle size of the pigment in the present invention denotes a volume average particle size, and in the Examples, which will be described later, the particle size of the pigment was measured by means of a particle size distribution measuring apparatus for concentrated systems, FPAR-1000 (trade name, manufactured by OTSUKA ELECTRONICS CO., LTD.). Second, the content of the salt is particularly favorably determined in such a manner that the viscosity of a liquid obtained by evaporating 15% by mass of the ink is less than 3.5 mPa·s at 25° C. Incidentally, "the initial ink before the evaporation" in this case means an ink at the point of time when a plastic packaging bag thereof, which is a form in the market of an ink cartridge storing the ink according to the present invention, is opened, and is in the equivalent state as an ink at the point of time when the ink is prepared.

According to an investigation by the present inventors, the effects by the addition of the salt on acceleration of aggregation of the pigment in a recording medium and improvement in image density thereby can be predicted to some extent by the particle size of the pigment at the time 40% by mass of the ink has been evaporated. More specifically, according to the investigation by the present inventors, it can be more surely concluded that the effect to sufficiently increase the image density has been achieved when the particle size of the pigment in a liquid obtained by evaporating 40% by mass of the ink is 1.2 times or more as much as the particle size of the pigment in the initial ink before the evaporation. Incidentally, the particle size of the pigment in the liquid obtained by evaporating 40% by mass of the ink is favorably 10.0 times or less as much as the particle size of the pigment in the initial ink before the evaporation. In addition, according to another investigation by the present inventors, it has also been found that sufficient performance may not be achieved in the reliability of an ink jet recording system in some cases when the viscosity of a liquid obtained by evaporating 15% by mass of the ink is 3.5 mPa·s or more at 25° C., and so the ink needs to be designed for this point. Incidentally, the viscosity of the liquid obtained by evaporating 15% by mass of the ink is favorably 1.0 mPa·s or more at 25° C.

Cation Concentration:

The cations present in the ink according to the present invention are $K^+$ and $NH_4^+$ derived from the counter ion of the functional group of the pigment and the cation constituting the salt. Quite naturally, any other cation than these cations may be contained within a range achieving the effect of the present invention. In the present invention, the cation concentration in the ink needs to be 0.04 mol/L or more. According to an investigation by the present inventors, a sufficient image density is not achieved when the cation concentration is less than 0.04 mol/L. The upper limit of the cation concentration in the ink is also relevant to the particle size of the pigment and the viscosity of the ink upon the evaporation and is favorably 0.09 mol/L or less. The upper limit of more than 0.09 mol/L is not favorable because the evaporation stability of the ink may not be sufficiently achieved in some cases.

According to an investigation by the present inventors, the total concentration of $K^+$ and $NH_4^+$ in the ink is favorably 73% or more in terms of mol based on the total concentration of alkali metal ions and ammonium ion in the ink. In other words, when it is less than 73%, a sufficient image density may not be achieved in some cases. Incidentally, any other cation than $K^+$ and $NH_4^+$ may be present in the ink according to the present invention as described above. However, the proportion of $K^+$ and $NH_4^+$ with respect to the cations present in the ink is favorably made as high as possible for achieving the effect of the present invention at a high level. Accordingly, all the cations in the ink are particularly favorably $K^+$ and $NH_4^+$, exclusive of such cations as unintentionally mixed as impurities of the components of the ink. For the same reason, polyvalent metals such as calcium and divalent or higher-valence cations are favorably substantially not contained.

Aqueous Medium:

The ink according to the present invention may contain an aqueous medium that is a mixed solvent of water and a water-soluble organic solvent. Deionized water is favorably used as water. The content (% by mass) of water in the ink is favorably 50.0% by mass or more and 95.0% by mass or less based on the total mass of the ink. The content (% by mass) of the water-soluble organic solvent in the ink is favorably 3.0% by mass or more and 50.0% by mass or less based on the total mass of the ink. As the water-soluble organic solvent, may be use any of those usable in ink jet inks, such as alcohols, glycols, glycol ethers and nitrogen-containing compounds, and one or more organic solvents may be contained in the ink.

Other Additives:

The ink according to the present invention may also contain a water-soluble organic compound which is solid at ordinary temperature such as urea or a derivative thereof, trimethylolpropane, or trimethylolethane in addition to the above-described components. The content (% by mass) of the water-soluble organic compound which is solid at ordinary temperature in the ink is favorably 0.1% by mass or more and 20.0% by mass or less, more favorably 3.0% by mass or more and 10.0% by mass or less, based on the total mass of the ink. In addition, the ink may contain various additives such as a surfactant, a resin, a pH adjustor, an antifoaming agent, a rust preventive, a preservative, a mildewproofing agent, an antioxidant, an antireductant and a chelating agent, as needed.

In the present invention, a surfactant of an acetylene glycol type, fluorine-containing type, silicone type or polyoxyethylene alkyl ether type is favorably contained in the ink. The content (% by mass) of the surfactant in the ink is favorably 0.05% by mass or more and 2.0% by mass or less based on the total mass of the ink.

Physical Properties of the Ink:

The dynamic surface tension of the ink according to the present invention at a lifetime of 50 milliseconds at 25° C. is favorably 40 mN/m or more, more favorably 45 mN/m or more. By satisfying such property, the pigment can be caused to be particularly efficiently present on the surface of a recording medium to achieve a higher image density. In the present invention, the dynamic surface tension of the ink was measured by using a maximum bubble pressure method. According to this method, a maximum pressure required to release a bubble pushed out of a tip portion of a probe (capillary) dipped in a liquid to be measured is measured, and a surface tension is found from this pressure. In the present invention, "lifetime" means a time period from a point of time when a new surface is formed after a bubble has been released from the tip portion to a point of time of a maximum bubble pressure (a point of time when a curvature radius of the bubble becomes equal to a radius of the tip portion of the probe), upon the formation of the bubble at the tip portion of the probe in the maximum bubble pressure method.

In order for the ink according to the present invention to satisfy the property of the dynamic surface tension, a polyoxyethylene alkyl ether among the surfactants mentioned above is particularly favorably used. The polyoxyethylene alkyl ether used is particularly favorably that which has an HLB value of 13 or more and 20 or less as determined by the Griffin's method, and the number of carbon atoms in the alkyl group of which is 12 or more and 20 or less. The content (% by mass) of the polyoxyethylene alkyl ether in the ink is favorably 0.05% by mass or more and 2.0% by mass or less, more favorably 0.05% by mass or more and 1.0% by mass or less, based on the total mass of the ink.

As described above, the ink according to the present invention requires that the viscosity of a liquid obtained by evaporating 15% by mass of the ink is less than 3.5 mPa·s at 25° C. In order for the ink to satisfy this condition, it is particularly favorable to set the contents of the respective components in the ink within the following respective ranges. More specifically, it is favorable that based on the total mass of the ink, the content of the pigment is 1.0% by mass or more and 5.0% by mass or less, the content of the water-soluble organic solvent is 10.0% by mass or more and 40.0% by mass or less, and the content of the salt is 0.05% by mass or more and 1.0% by mass or less. By setting the contents within such ranges, the above-described requirement that the particle size of the pigment in a liquid obtained by evaporating 40% by mass of the ink is 1.2 times or more as much as the particle size of the pigment in the initial ink before the evaporation can be easily satisfied. Incidentally, the viscosity at 25° C. of the ink before the evaporation may be comparable to that of a common ink jet ink and is favorably 1.0 mP·s or more and 5.0 mP·s or less, more favorably 1.0 mP·s or more and 3.0 mP·s or less at 25° C.

In the present invention, the static surface tension of the ink is favorably 28 mN/m or more and 45 mN/m or less at 25° C. The pH of the ink is favorably 5 or more and 8 or less, at 25° C.

Ink Cartridge:

The ink cartridge according to the present invention has an ink and an ink storage portion storing the ink, and the ink stored in the ink storage portion is the above-described ink according to the present invention. The structure of the ink cartridge is such that the ink storage portion is formed by a negative pressure generating member storing chamber storing a negative pressure generating member for holding the ink in a state of being impregnated by a negative pressure, and an ink storage chamber storing the ink in a state of not being impregnated by the negative pressure generating member. The ink storage portion may be so constructed that the whole amount of the ink is held in the state of being impregnated by the negative pressure generating member without having such an ink storage chamber as described above, or the whole amount of the ink is stored in the state of not being impregnated by the negative pressure generating member without having the negative pressure generating member. In addition, the ink cartridge may be constructed so as to have an ink storage portion and a recording head.

Ink Jet Recording Method:

The ink jet recording method according to the present invention is a method in which the above-described ink according to the present invention is ejected from a recording head of an ink jet system to record an image on a recording medium. As systems for ejecting the ink, are mentioned a system in which mechanical energy is applied to the ink and a system in which thermal energy is applied to the ink. In the present invention, an ink jet recording method utilizing the thermal energy is particularly favorably used. The process of the ink jet recording method may be that publicly known except that the ink according to the present invention is used.

Taking the above-described mechanism into consideration, the above-described ink according to the present invention is more favorably used for recording an image on a recording medium containing calcium. Examples of such a recording medium include glossy paper and plain paper. Among these, plain paper is particularly favorably used. Needless to say, the recording medium usable in the ink jet recording method according to the present invention is not limited thereto.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" as will be used below are based on mass unless expressly noted.

Preparation of Pigment Dispersion Liquid:

Introduced Amount of Functional Group in Pigment:

A method for measuring the introduced amount of a functional group in a pigment is first described. A pigment dispersion liquid was diluted with pure water in such a manner that the content of a pigment to be measured is about 0.03% to prepare a liquid A. The pigment dispersion liquid was ultra-centrifuged under conditions of 5° C., 80,000 rpm and 15 hours to collect a supernatant liquid from which the bisphosphonic acid type self-dispersible pigment had been removed, and this liquid was diluted to about 80 times with pure water to prepare a liquid B. With respect to the thus obtained liquids A and B, quantitative analysis of phosphorus was performed by means of an ICP emission spectral analyzer (SPS5100, manufactured by SII NanoTechnology Inc.). The amount of the phosphonic acid group was then found from a difference in the amount of phosphorus between the liquids A and B, and this amount was divided by the number of phosphonic acid groups contained in one functional group to calculate out the introduced amount of the functional group in the pigment.

Pigment Dispersion Liquid A:

20 grams (solid content) of carbon black, 9 mmol of monosodium ((4-aminobenzoylamino)-methane-1,1-diyl)bisphosphonate (treatment agent), 20 mmol of nitric acid and 200 mL of pure water were mixed. At this time, Black Pearls 880 (trade name, product of CABOT CO.) was used as the carbon black, and the mixing was conducted at room temperature and 6,000 rpm by means of a Silverson mixer. After 30 minutes, 20 mmol of sodium nitrite dissolved in a small amount of pure water was slowly added to this mixture. By this mixing, the temperature of the mixture reached 60° C., and a reaction was conducted for 1 hour in this state. Thereafter, the pH of the mixture was adjusted to 10 with an aqueous solution of sodium hydroxide. After 30 minutes, 20 mL of pure water was added, diafiltration was conducted by means of a spectrum membrane, and the content of the pigment was then adjusted to 10.0% to obtain a dispersion liquid. In this manner, a pigment dispersion liquid A in such a state that a self-dispersible pigment to the surfaces of particles of which a —$C_6H_4$—CONH—CH—(PO(OH)(ONa)) (PO(OH)$_2$) group had been bonded was dispersed in water, which was used in Comparative Examples, was obtained. The introduced amount of the functional group was 0.33 mmol/g.

Pigment Dispersion Liquid B:

The sodium ion in the pigment dispersion liquid A obtained above was replaced by a potassium ion by an ion exchange method to obtain a dispersion liquid, the content of the pigment in which was 10.0%. In this manner, a pigment dispersion liquid B in such a state that a self-dispersible pigment to the surfaces of particles of which a —$C_6H_4$—CONH—CH—(PO(OH)(OK))(PO(OH)$_2$) group had been bonded was dispersed in water, which was usable in Examples, was obtained. The introduced amount of the functional group was 0.33 mmol/g.

Pigment Dispersion Liquid C:

The sodium ion in the pigment dispersion liquid A obtained above was replaced by an ammonium ion by an ion exchange method to obtain a dispersion liquid, the content of the pigment in which was 10.0%. In this manner, a pigment dispersion liquid C in such a state that a self-dispersible pigment to the surfaces of particles of which a —$C_6H_4$—CONH—CH—(PO(OH)($ONH_4$))(PO(OH)$_2$) group had been bonded was dispersed in water, which was usable in Examples, was obtained. The introduced amount of the functional group was 0.33 mmol/g.

Pigment Dispersion Liquid D:

A dispersion liquid was prepared according to the same procedure as in the pigment dispersion liquid A except that the amount of the treatment agent used in the preparation of the pigment dispersion liquid A was changed from 9 mmol to 7 mmol. In addition, the sodium ion was replaced by an ammonium ion by an ion exchange method to obtain a dispersion liquid, the content of the pigment in which was 10.0%. In this manner, a pigment dispersion liquid D in such a state that a self-dispersible pigment to the surfaces of particles of which a —$C_6H_4$—CONH—CH—(PO(OH)($ONH_4$))(PO(OH)$_2$) group had been bonded was dispersed in water, which was usable in Examples, was obtained. The introduced amount of the functional group was 0.28 mmol/g.

Pigment Dispersion Liquid E:

A dispersion liquid was prepared according to the same procedure as in the pigment dispersion liquid A except that the amount of the treatment agent used in the preparation of the pigment dispersion liquid A was changed from 9 mmol to 11 mmol. In addition, the sodium ion was replaced by an ammonium ion by an ion exchange method to obtain a dispersion liquid, the content of the pigment in which was 10.0%. In this manner, a pigment dispersion liquid E in such a state that a self-dispersible pigment to the surfaces of particles of which a —$C_6H_4$—CONH—CH—(PO(OH)($ONH_4$))(PO(OH)$_2$) group had been bonded was dispersed in water, which was usable in Examples, was obtained. The introduced amount of the functional group was 0.38 mmol/g.

Pigment Dispersion Liquid F:

A dispersion liquid was prepared according to the same procedure as in the pigment dispersion liquid A except that the amount of the treatment agent used in the preparation of the pigment dispersion liquid A was changed from 9 mmol to 14 mmol. In addition, the sodium ion was replaced by an ammonium ion by an ion exchange method to obtain a dispersion liquid, the content of the pigment in which was 10.0%. In this manner, a pigment dispersion liquid F in such a state that a self-dispersible pigment to the surfaces of particles of which a —$C_6H_4$—CONH—CH—(PO(OH)($ONH_4$))(PO(OH)$_2$) group had been bonded was dispersed in water, which was usable in Examples, was obtained. The introduced amount of the functional group was 0.46 mmol/g.

Pigment Dispersion Liquid G:

Sodium alendronate was used to synthesize sodium (4-(4-aminobenzenesulfonylamino)-1-hydroxybutane-1,1-diyl)-bisphosphonate. At this time, monosodium (4-amino-1-hydroxybutane-1,1-diyl)bisphosphonate (product of Zentiva Co.) was used as sodium alendronate. 34 grams of the alendronate was added into 150 mL of pure water in a 500-mL beaker, and the pH of the liquid was adjusted to 11 with a concentrated aqueous solution of sodium hydroxide to dissolve the alendronate. 25 grams (110 mmol) of nitrophenylsulfonyl chloride dissolved in 100 mL of tetrahydrofuran was added dropwise into this solution. At this time, the aqueous solution of sodium hydroxide was additionally added to keep the pH of the liquid at 10 to 11. After completion of the drop, this liquid was stirred additionally for 2 hours at room temperature. Thereafter, tetrahydrofuran was evaporated in vacuum, and the pH of this liquid was adjusted to 4 to deposit solids. After cooling overnight at 4° C., the solids were separated by filtration, washed with pure water and dried to obtain sodium (4-(4-aminobenzenesulfonylamino)-1-hydroxybutane-1,1-diyl)bisphosphonate.

20 grams (solid content) of carbon black, 8 mmol of sodium (4-(4-aminobenzenesulfonylamino)-1-hydroxybutane-1,1-diyl)bisphosphonate (treatment agent), 20 mmol of nitric acid and 200 mL of pure water were mixed. At this time, Black Pearls 880 (trade name, product of CABOT CO.) was used as the carbon black, and the mixing was conducted at room temperature and 6,000 rpm by means of a Silverson mixer. After 30 minutes, 20 mmol of sodium nitrite dissolved in a small amount of pure water was slowly added to this mixture. By this mixing, the temperature of the mixture reached 60° C., and a reaction was conducted for 1 hour in this state. Thereafter, the pH of the mixture was adjusted to 10 with an aqueous solution of sodium hydroxide. After 30 minutes, 20 mL of pure water was added, diafiltration was conducted by means of a spectrum membrane, the sodium ion was then replaced by an ammonium ion by an ion exchange method, and the content of the pigment was adjusted to 10.0% to obtain a dispersion liquid. In this manner, a pigment dispersion liquid G in such a state that a self-dispersible pigment to the surfaces of particles of which a —$C_6H_4$—$SO_2$—NH—$C_4H_6$(OH)(PO(OH)($ONH_4$))—(PO(OH)$_2$) group had been bonded was dispersed in water, which was usable in Examples, was obtained. The introduced amount of the functional group was 0.29 mmol/g.

Pigment Dispersion Liquid H:

A dispersion liquid was prepared according to the same procedure as in the pigment dispersion liquid A except that the amount and kind of the treatment agent used in the preparation of the pigment dispersion liquid A were changed to 7 mmol of 4-aminobenzylphosphonic acid (product of Sigma-Aldrich Co.). In addition, the sodium ion was replaced by an ammonium ion by an ion exchange method to obtain a dispersion liquid, the content of the pigment in which was 10.0%. In this manner, a pigment dispersion liquid H in such a state that a self-dispersible pigment to the surfaces of particles of which a —$C_6H_4$—$CH_2$—(PO($ONH_4$)$_2$) group had been bonded was dispersed in water, which was used in Comparative Examples, was obtained. The introduced amount of the functional group was 0.33 mmol/g.

Pigment Dispersion Liquid I:

Under cooling at 5° C., 1.5 g of 4-amino-1,2-benzenedicarboxylic acid (treatment agent, product of TOKYO CHEMICAL INDUSTRY CO., LTD.) was added into a solution of 5 g of concentrated hydrochloric acid dissolved in 5.5 g of water. A container containing this solution was then placed in an ice bath, and the solution was stirred, thereby laying this solution in a state of always cooling at 10° C. or less. A solution of 1.8 g of potassium nitrite dissolved in 9 g of water at 5° C. was added into this solution. After this solution was stirred additionally for 15 minutes, 6 g of Black Pearls 880 (trade name, product of CABOT CO.) that is carbon black was added into this solution under stirring. Thereafter, stirring was conducted additionally for 15 minutes. After the resultant slurry was subjected to diafiltration by means of a spectrum membrane, particles were sufficiently washed with water and dried in an oven of 110° C. In addition, the potassium ion was replaced by an ammonium ion by an ion exchange method, and pure water was added in such a manner that the content of the pigment is 10.0% to disperse the particles therein, thereby obtaining a dispersion liquid. In this manner, a pigment dispersion liquid I in such a state that a self-dispersible pigment to the surfaces of particles of which a —$C_6H_3$—(COO$NH_4$)$_2$ group had been bonded was dispersed in water, which was used in Comparative Examples, was obtained. The introduced amount of the functional group was determined by measuring the potassium ion concentration in the dispersion liquid before the ion exchange method was conducted by an ICP emission spectral analyzer (SPS5100, manufactured by SII NanoTechnology Inc.) and converting the potassium ion concentration thus obtained. The introduced amount of the functional group was 0.40 mmol/g.

Preparation of Ink:

After the components shown in Table 2 were mixed and sufficiently stirred, the resultant respective mixtures were filtered under pressure through a polypropylene filter (product of Pall Corporation) having a pore size of 2.5 μm, thereby preparing respective inks. In Table 2, "NIKKOL BL-9EX" is polyoxyethylene lauryl ether produced by Nikko Chemicals Co., Ltd. and is a surfactant whose HLB value is 13.6 as determined by the Griffin's method, and the number of moles of the ethylene oxide group added to which is 9, and "ACETYLENOL E100" is an acetylene glycol ethylene oxide adduct produced by Kawaken Fine Chemicals Co., Ltd. and is a surfactant, the number of moles of the ethylene oxide group added to which is 10.

TABLE 2-1

Composition of ink

| | Example | | | | | | | | |
|---|---|---|---|---|---|---|---|---|---|
| | 1 | 2 | 3 | 4 | 5 | 6 | 7 | 8 | 9 |
| Pigment dispersion A | | | | | | | | | |
| Pigment dispersion B | 30.00 | | 30.00 | | | | | | |
| Pigment dispersion C | | 30.00 | | | 30.00 | 30.00 | | | |
| Pigment dispersion D | | | | 30.00 | | | | | |
| Pigment dispersion E | | | | | | | 30.00 | | |
| Pigment dispersion F | | | | | | | | 30.00 | |
| Pigment dispersion G | | | | | | | | | 30.00 |
| Pigment dispersion H | | | | | | | | | |
| Pigment dispersion I | | | | | | | | | |
| Glycerol | 8.00 | 8.00 | 8.00 | 8.00 | 8.00 | 8.00 | 8.00 | 8.00 | 8.00 |
| 2-Pyrrolidone | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Trimethylol-propane | 5.00 | 5.00 | 5.00 | 5.00 | 5.00 | 5.00 | 5.00 | 5.00 | 5.00 |
| NIKKOL BL-9EX | 0.12 | 0.12 | 0.12 | 0.12 | 0.12 | 0.12 | 0.12 | 0.12 | 0.12 |
| ACETYLENOL E100 | | | | | | | | | |
| Diammonium phthalate | | | 0.21 | 0.51 | 0.13 | 0.39 | 0.25 | 0.18 | 0.29 |
| Dilithium phthalate | | | | | | | | | |
| Disodium phthalate | | | | | | | | | |
| Dipotassium phthalate | 0.44 | 0.43 | | | | | | | |
| Diammonium sulfate | | | | | | | | | |
| Diammonium succinate | | | | | | | | | |
| Ammonium benzoate | | | | | | | | | |
| Pure water | 46.44 | 46.45 | 46.67 | 46.37 | 46.75 | 46.49 | 46.63 | 46.70 | 46.59 |

TABLE 2-2

Composition of ink

| | Example | | | | | |
|---|---|---|---|---|---|---|
| | 10 | 11 | 12 | 13 | 14 | 15 |
| Pigment dispersion A | | | | | | |
| Pigment dispersion B | | | | | | |
| Pigment dispersion C | 30.00 | 30.00 | 30.00 | 30.00 | 30.00 | 30.00 |
| Pigment dispersion D | | | | | | |
| Pigment dispersion E | | | | | | |
| Pigment dispersion F | | | | | | |
| Pigment dispersion G | | | | | | |
| Pigment dispersion H | | | | | | |
| Pigment dispersion I | | | | | | |
| Glycerol | 8.00 | 8.00 | 8.00 | 8.00 | 8.00 | 8.00 |
| 2-Pyrrolidone | 5.00 | 5.00 | 5.00 | 5.00 | 5.00 | 5.00 |

TABLE 2-2-continued

| Composition of ink | | | | | | |
|---|---|---|---|---|---|---|
| | Example | | | | | |
| | 10 | 11 | 12 | 13 | 14 | 15 |
| Triethylene glycol | 5.00 | 5.00 | 5.00 | 5.00 | 5.00 | 5.00 |
| Trimethylol-propane | 5.00 | 5.00 | 5.00 | 5.00 | 5.00 | 5.00 |
| NIKKOL BL-9EX | 0.12 | 0.12 | 0.12 | | 0.12 | 0.12 |
| ACETYLENOL E100 | | | | 0.12 | | |
| Diammonium phthalate | | | | 0.39 | 0.63 | 0.72 |
| Dilithium phthalate | | | | | | |
| Disodium phthalate | | | | | | |
| Dipotassium phthalate | | | | | | |
| Diammonium sulfate | 0.26 | | | | | |
| Diammonium succinate | | 0.30 | | | | |
| Ammonium benzoate | | | 0.47 | | | |
| Pure water | 46.62 | 46.58 | 46.41 | 46.49 | 46.25 | 46.16 |

TABLE 2-3

| Composition of ink | | | | | | | | | | |
|---|---|---|---|---|---|---|---|---|---|---|
| | Comparative Example | | | | | | | | | |
| | 1 | 2 | 3 | 4 | 5 | 6 | 7 | 8 | 9 | 10 |
| Pigment dispersion A | | | 30.00 | | | | | | | |
| Pigment dispersion B | | | | | | | | | | |
| Pigment dispersion C | 30.00 | 30.00 | | | | | | | | |
| Pigment dispersion D | | | | | 30.00 | | | | | |
| Pigment dispersion E | | | | | | | | | | |
| Pigment dispersion F | | | | 30.00 | | | | | | |
| Pigment dispersion G | | | | | | | | | | |
| Pigment dispersion H | | | | | | | | | | 30.00 |
| Pigment dispersion I | | | | | | 30.00 | 30.00 | 30.00 | 30.00 | |
| Glycerol | 8.00 | 8.00 | 8.00 | 8.00 | 8.00 | 8.00 | 8.00 | 8.00 | 8.00 | 8.00 |
| 2-Pyrrolidone | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 |
| Trimethylol-propane | 5.00 | 5.00 | 5.00 | 5.00 | 5.00 | 5.00 | 5.00 | 5.00 | 5.00 | 5.00 |
| NIKKOL BL-9EX | 0.12 | 0.12 | 0.12 | 0.12 | 0.12 | 0.12 | 0.12 | 0.12 | 0.12 | 0.12 |
| ACETYLENOL E100 | | | | | | | | | | |
| Diammonium phthalate | | 0.05 | | | 0.80 | 0.53 | 0.58 | 0.33 | | 0.38 |
| Dilithium phthalate | 0.07 | | | | | | | | | |
| Disodium phthalate | | | 0.03 | | | | | | | |
| Dipotassium phthalate | | | | | | | | | | |
| Diammonium sulfate | | | | | | | | | | |
| Diammonium succinate | | | | | | | | | | |
| Ammonium benzoate | | | | | | | | | | |
| Pure water | 46.81 | 46.83 | 46.85 | 46.88 | 46.08 | 46.35 | 46.30 | 46.55 | 46.88 | 46.50 |

Measurements of Main Properties of Ink:
Cation Concentration in Ink:

Each of the inks obtained above was diluted with pure water in such a manner that the content of the pigment (solid content) is 0.03% in terms of absorbance, and for this resultant liquid, the cation concentration in the ink was measured by means of an ICP emission spectral analyzer (SPS5100, manufactured by SII NanoTechnology Inc.). Since an $NH_4^+$ concentration cannot be measured by the ICP emission spectral analyzer, the $NH_4^+$ concentration in the same liquid as described above was measured by means of an ion/pH meter (manufactured by THERMO ELECTRON Co., Ltd.). The results are shown in Table 3.

Dynamic Surface Tension of Ink:

With respect to the respective inks obtained above, the dynamic surface tensions at 25° C. were measured by means of Bubble Pressure Tensiometer BP2 MK2 (trade name, manufactured by Kruss Co.) utilizing the maximum bubble pressure method. The evaluation criteria are as follows. The results are shown in Table 3.

A: The dynamic surface tension at a lifetime of 50 milliseconds was 40 mN/m or more;
B: The dynamic surface tension at a lifetime of 50 milliseconds was less than 40 mN/m.

Determination of Salt Content in Ink:

Whether the salt is contained in an ink to an effective extent for improvement in the image density or not can be roughly determined by comparing the particle size of the pigment in the ink before evaporation with the particle size of the pigment in a liquid obtained by evaporating 40% of the ink. First, the particle size of the pigment in each of the inks obtained above was measured. Each ink was then placed in an open container to evaporate the ink under conditions of 60° C., thereby concentrating the ink to 60% of an initial mass, i.e., evaporating 40% of the ink, to obtain a liquid. The particle size of the pigment in the resultant liquid was measured. Incidentally, the particle size of the pigment is of a volume average particle size measured by means of a particle size distribution measuring apparatus for concentrated systems, FPAR-1000 (trade name, manufactured by OTSUKA ELECTRONICS CO., LTD.). The rate of change in the particle size of the pigment between before and after the evaporation (particle size of the pigment after evaporation/particle size of the pigment before evaporation) was found to determine the salt content in the ink. The evaluation criteria are as follows. The results are shown in Table 3. In the present invention, the case where the salt is contained to an effective extent for improvement in the image density was ranked as A in the following evaluation criteria, and if not as B.

A: The rate of change in the particle size of the pigment was 1.2 times or more;
B: The rate of change in the particle size of the pigment was less than 1.2 times.

Evaluations of Ink:
Image Density:

An ink cartridge charged with each of the inks obtained above was set in an ink jet recording apparatus PIXUS MP480 (trade name, manufactured by Canon Inc.), in which a recording head ejecting an ink by thermal energy was installed. Incidentally, in the above-described ink jet recording apparatus, the conditions when the resolution is 600 dpi× 600 dpi, and one ink droplet whose mass is 25 ng ±10% is applied to a unit region of 1/600 inch×1/600 inch are defined as a recording duty of 100%. A solid image (2 cm×2 cm/line) with a recording duty of 100% was recorded on the following 3 recording media (plain paper). As the recording medium, was used each of the following recording media. More specifically, Canon Extra Multifunctional Paper and Office Planner (both, product of Canon Inc.), and Xerox 4024 Premium Multipurpose White Paper (product of Xerox Co.) were used. After one day from the recording, image densities of the solid images on the 3 recording media were measured by means of a reflection densitometer Macbeth RD-918 (trade name; manufactured by Macbeth Co.) to make evaluation as to the image density with average values thereof. The evaluation criteria are as follows. The results are shown in Table 3. In the present invention, AA and A in the following evaluation criteria were regarded as an acceptable level, and B and C were regarded as an unacceptable level.

AA: The average value was 1.45 or more;
A: The average value was 1.35 or more and less than 1.45;
B: The average value was 1.25 or more and less than 1.35
C: The average value was less than 1.25.

Viscosity of evaporated ink and evaporation stability:

Each of the inks obtained above was placed in an open container to evaporate the ink under conditions of 30° C. temperature and 10% relative humidity, thereby concentrating the ink to 85% of an initial mass, i.e., evaporating 15% of the ink, to obtain a liquid. The viscosity at 25° C. of the resultant liquid was measured by means of an E-type viscometer (RE-80L, manufactured by TOKI Co.) to make evaluation as to the evaporation stability. Incidentally, as described above, the numeral value of 15% as to the evaporation rate is a sufficiently higher value than the amount of evaporation of the ink, which may occur when conditions upon physical distribution and use of the ink are taken into consideration, and it is severer than actually assumed conditions. Accordingly, it is supposed that the ink has sufficient evaporation stability so far as the evaporation stability evaluated under such severer conditions is sufficient. The evaluation criteria are as follows. The results are shown in Table 3. In the present invention, A and B in the following evaluation criteria were regarded as an acceptable level, and C is regarded as an unacceptable level.

A: The viscosity of the liquid obtained by evaporating 15% of the ink was less than 3.0 mPa·s;
B: The viscosity of the liquid obtained by evaporating 15% of the ink was 3.0 mPa·s or more and less than 3.5 mPa·s;
C: The viscosity of the liquid obtained by evaporating 15% of the ink was 3.5 mPa·s or more.

TABLE 3

Main properties of ink and evaluation results

| | Main properties of ink | | | Evaluation results | |
|---|---|---|---|---|---|
| | Cation concentration in ink [mol/L] | Dynamic surface tension of ink | Determination of salt content in ink | Image density | Viscosity of evaporated ink and evaporation stability |
| Ex. 1 | 0.054 | A | A | AA | A |
| Ex. 2 | 0.063 | A | A | AA | A |
| Ex. 3 | 0.040 | A | A | AA | A |
| Ex. 4 | 0.075 | A | A | AA | A |
| Ex. 5 | 0.040 | A | A | AA | A |
| Ex. 6 | 0.066 | A | A | AA | A |
| Ex. 7 | 0.055 | A | A | AA | A |
| Ex. 8 | 0.053 | A | A | A | A |
| Ex. 9 | 0.054 | A | A | A | A |
| Ex. 10 | 0.066 | A | A | AA | A |
| Ex. 11 | 0.066 | A | A | AA | A |
| Ex. 12 | 0.061 | A | A | A | A |

TABLE 3-continued

Main properties of ink and evaluation results

| | Main properties of ink | | | Evaluation results | |
|---|---|---|---|---|---|
| | Cation concentration in ink [mol/L] | Dynamic surface tension of ink | Determination of salt content in ink | Image density | Viscosity of evaporated ink and evaporation stability |
| Ex. 13 | 0.066 | B | A | A | A |
| Ex. 14 | 0.090 | A | A | AA | A |
| Ex. 15 | 0.099 | A | A | AA | B |
| Comp. Ex. 1 | 0.026 | A | A | B | A |
| Comp. Ex. 2 | 0.032 | A | B | C | A |
| Comp. Ex. 3 | 0.028 | A | A | C | A |
| Comp. Ex. 4 | 0.035 | A | B | C | A |
| Comp. Ex. 5 | 0.116 | A | A | AA | C |
| Comp. Ex. 6 | 0.077 | A | A | B | A |
| Comp. Ex. 7 | 0.082 | A | A | B | A |
| Comp. Ex. 8 | 0.057 | A | A | B | A |
| Comp. Ex. 9 | 0.024 | A | B | C | A |
| Comp. Ex. 10 | 0.063 | A | A | B | A |

Inks using other salts of the anion specified in the present invention than those used in Examples were also evaluated in the same manner as in Examples 1 and 4. Specifically, evaluations were made in the same manner as described above except that the anions of the salts in Examples 1 and 4 were respectively changed. As a result, almost the same results as those of Example 1 for potassium salts and as Example 4 for ammonium salts were yielded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-174065, filed Aug. 3, 2010, which is hereby incorporated by reference herein in its entirety.

What is claimed is:

1. An ink jet ink comprising a self-dispersible pigment and a salt,
wherein the self-dispersible pigment is a pigment to a surface of a particle of which a functional group containing at least a group having a hydrogen bonding property and two phosphonic acid groups is bonded, counter ions of the two phosphonic acid groups containing at least one of $K^+$ and $NH_4^+$,
wherein the salt is constituted by combining at least one cation of $K^+$ and $NH_4^+$ with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$,
wherein a cation concentration in the ink is 0.04 mol/L or more,
wherein a viscosity of a liquid obtained by evaporating 15% by mass of the ink is less than 3.5 mPa·s at 25° C., and
wherein the total concentration of $K^+$ and $NH_4^+$ in the ink is 73% or more in terms of mol based on the total concentration of alkali metal ion and ammonium ion in the ink.

2. The ink according to claim 1, wherein the functional group contains a structure of $-CQ(PO_3[M_1]_2)_2$, where Q is any one of a hydrogen atom, R, OR, SR and $N(R)_2$, R is any one of a hydrogen atom, an alkyl group, an acyl group, an aralkyl group and an aryl group, and $M_1$ is any one of H, K and $NH_4$ and contains at least one of K and $NH_4$.

3. The ink according to claim 2, wherein the Q is a hydrogen atom.

4. The ink according to claim 1, wherein the group having a hydrogen bonding property is at least one selected from the group consisting of amide group, amino group, ketone group, ester group and hydroxyl group.

5. The ink according to claim 1, wherein an introduced amount of the functional group bonded to the self-dispersible pigment is 0.38 mmol/g or less.

6. The ink according to claim 1, wherein the anion constituting the salt is at least one selected from the group consisting of $C_2H_4(COO^-)_2$, $C_6H_4(COO^-)_2$ and $SO_4^{2-}$.

7. The ink according to claim 1, wherein the cation concentration in the ink is 0.09 mol/L or less.

8. An ink cartridge comprising an ink and an ink storage portion storing the ink, wherein the ink is the ink according to claim 1.

9. An ink jet recording method comprising ejecting an ink from an ink jet recording head to record an image on a recording medium, wherein the ink is the ink according to claim 1.

10. The ink according to claim 1, wherein an introduced amount of the functional group bonded to the self-dispersible pigment is 0.10 mmol/g or more.

11. The ink according to claim 1, wherein the content (% by mass) of the self-dispersible pigment in the ink is 0.1% by mass or more and 15.0% by mass or less.

12. The ink according to claim 1, wherein the ink further comprises a polyoxyethylene alkyl ether which has an HLB value of 13 or more and 20 or less as determined by the Griffin's method.

13. The ink according to claim 1, wherein the viscosity of the liquid obtained by evaporating 15% by mass of the ink is 1.0 mPa·s or more at 25° C.

14. The ink according to claim 1, wherein a viscosity of the ink is 1.0 mPa·s or more and 5.0 mPa·s or less at 25° C.

15. The ink according to claim 1, wherein a pH of the ink is 5 or more and 8 or less at 25° C.

16. The ink according to claim 1, wherein the two counter ions of the self-dispersible pigment and the cation of the salt include the same ion.

17. The ink according to claim 1, wherein both the two counter ions of the self-dispersible pigment and the cation of the salt include $NH_4^+$.

18. The ink according to claim 1, wherein the at least one anion constituting the salt is $C_6H_4(COO^-)_2$.

19. The ink according to claim 1, wherein the salt is $C_6H_4(COONH_4)_2$.

20. The ink jet recording method according to claim 9, wherein the recording medium comprises calcium.

* * * * *